US007548158B2

(12) United States Patent
Titus et al.

(10) Patent No.: US 7,548,158 B2
(45) Date of Patent: Jun. 16, 2009

(54) FIRST RESPONDER WIRELESS EMERGENCY ALERTING WITH AUTOMATIC CALLBACK AND LOCATION TRIGGERING

(75) Inventors: Mark A. Titus, Annapolis, MD (US); Joseph Pohutsky, Annapolis, MD (US)

(73) Assignee: TeleCommunication Systems, Inc., Annapolis, MD (US)

( * ) Notice: Subject to any disclaimer, the term of this patent is extended or adjusted under 35 U.S.C. 154(b) by 244 days.

(21) Appl. No.: 11/346,163

(22) Filed: Feb. 3, 2006

(65) Prior Publication Data

US 2007/0030144 A1 Feb. 8, 2007

Related U.S. Application Data

(60) Provisional application No. 60/706,050, filed on Aug. 8, 2005.

(51) Int. Cl.
G08B 1/08 (2006.01)
(52) U.S. Cl. .............................. 340/539.13; 340/539.17; 340/286.05
(58) Field of Classification Search .............. 340/539.1, 340/539.11, 539.14, 539.17, 539.18, 539.2, 340/500, 502, 506, 534, 539.13, 286.04, 340/286.05; 379/37, 42; 455/435.1, 456.1
See application file for complete search history.

(56) References Cited

U.S. PATENT DOCUMENTS

| 1,103,073 | A | 7/1914 | O'Connell | 379/152 |
|---|---|---|---|---|
| 3,920,908 | A | 11/1975 | Kraus | 379/91.02 |
| 4,310,726 | A | 1/1982 | Asmuth | 379/207.15 |
| 4,399,330 | A | 8/1983 | Kuenzel | 455/456.1 |
| 4,494,119 | A | 1/1985 | Wimbush | 342/457 |
| 4,651,156 | A | 3/1987 | Martinez | 342/457 |
| 4,680,785 | A | 7/1987 | Akiyama et al. | 340/7.21 |
| 4,706,275 | A | 11/1987 | Kamil | 379/114.2 |
| 4,725,719 | A | 2/1988 | Oncken et al. | 235/487 |
| 4,756,020 | A | 7/1988 | Fodale | 379/114.14 |
| 4,776,000 | A | 10/1988 | Parienti | 455/407 |
| 4,776,003 | A | 10/1988 | Harris et al. | 455/407 |
| 4,776,037 | A | 10/1988 | Rozanski | 455/166.2 |
| 4,831,647 | A | 5/1989 | D'Avello et al. | 455/408 |

(Continued)

FOREIGN PATENT DOCUMENTS

GB 2308528 6/1997

(Continued)

OTHER PUBLICATIONS

The Power of Mobile Unified Messaging: Siemans and Comverse to Demonstrate WAP-Based Messaging Applications on Live GPRS System, Comverse, Feb. 2000.

(Continued)

*Primary Examiner*—Van T. Trieu
(74) *Attorney, Agent, or Firm*—William H. Bollman

(57) ABSTRACT

Using wireless features, a public service agency is enabled to provide alert information to first responders. An automatic call back from the first responder triggers a voice call launching a location fix on the current location of the first responder. Preferably delivery confirmation that the responder has received the message is received. Once the location fix has been completed, then driving directions with map images are sent to the first responder based on their current location and desired destination for response.

28 Claims, 3 Drawing Sheets

U.S. PATENT DOCUMENTS

| | | | |
|---|---|---|---|
| 4,852,149 A | 7/1989 | Zwick et al. .............. 379/88.01 |
| 4,852,155 A | 7/1989 | Barraud ....................... 379/145 |
| 4,860,341 A | 8/1989 | D'Avello et al. ............ 455/409 |
| 4,891,638 A | 1/1990 | Davis ........................ 340/7.42 |
| 4,891,650 A | 1/1990 | Sheffer ...................... 342/457 |
| 4,901,340 A | 2/1990 | Parker et al. ............. 455/432.3 |
| 4,910,767 A | 3/1990 | Brugliera et al. |
| 4,935,956 A | 6/1990 | Hellwarth et al. ....... 379/114.02 |
| 4,952,928 A | 8/1990 | Carroll et al. ............. 340/10.41 |
| 5,003,585 A | 3/1991 | Richer .................... 379/114.18 |
| 5,014,206 A | 5/1991 | Scribner et al. ............. 701/207 |
| 5,043,736 A | 8/1991 | Darnell et al. ............ 342/357.1 |
| 5,046,088 A | 9/1991 | Margulies ................ 379/211.0 |
| 5,055,851 A | 10/1991 | Sheffer ..................... 340/539.1 |
| 5,063,588 A | 11/1991 | Patsiokas et al. ............. 340/7.1 |
| 5,068,891 A | 11/1991 | Marshall .................. 379/91.02 |
| 5,070,329 A | 12/1991 | Jasinaki ..................... 340/7.27 |
| 5,081,667 A | 1/1992 | Drori et al. .............. 455/404.1 |
| 5,103,449 A | 4/1992 | Jolissaint .................... 370/384 |
| 5,119,104 A | 6/1992 | Heller ........................ 342/450 |
| 5,127,040 A | 6/1992 | D'Avello et al. ............ 455/419 |
| 5,128,938 A | 7/1992 | Borras ........................ 370/311 |
| 5,138,648 A | 8/1992 | Palomeque et al. ............ 379/22 |
| 5,138,650 A | 8/1992 | Stahl et al. .................. 455/408 |
| 5,144,283 A | 9/1992 | Arens et al. ................. 340/506 |
| 5,144,649 A | 9/1992 | Zicker et al. ................ 455/409 |
| 5,159,625 A | 10/1992 | Zicker ..................... 455/432.1 |
| 5,161,180 A | 11/1992 | Chavous ........................ 379/45 |
| 5,177,478 A | 1/1993 | Wagai et al. ................. 340/7.4 |
| 5,193,215 A | 3/1993 | Olmer ........................ 455/521 |
| 5,208,756 A | 5/1993 | Song ........................ 455/456.3 |
| 5,214,789 A | 5/1993 | George ........................ 455/440 |
| 5,216,703 A | 6/1993 | Roy ........................... 455/417 |
| 5,218,367 A | 6/1993 | Sheffer et al. ................ 342/457 |
| 5,220,593 A | 6/1993 | Zicker et al. ................ 455/407 |
| 5,223,844 A | 6/1993 | Mansell et al. ......... 342/357.07 |
| 5,224,150 A | 6/1993 | Neustein .................... 340/7.44 |
| 5,233,642 A | 8/1993 | Renton ....................... 455/405 |
| 5,239,570 A | 8/1993 | Koster et al. .................. 379/45 |
| 5,265,155 A | 11/1993 | Castro ..................... 379/114.2 |
| 5,265,630 A | 11/1993 | Hartmann .................. 134/95.1 |
| 5,266,944 A | 11/1993 | Carroll et al. ............. 340/10.42 |
| 5,274,802 A | 12/1993 | Altine ........................ 707/202 |
| 5,289,527 A | 2/1994 | Tiedemann, Jr. .......... 455/435.1 |
| 5,291,543 A | 3/1994 | Freese et al. ................. 455/408 |
| 5,293,642 A | 3/1994 | Lo ........................... 455/456.2 |
| 5,297,189 A | 3/1994 | Chabernaud ................ 455/460 |
| 5,299,132 A | 3/1994 | Wortham .................... 455/457 |
| 5,301,223 A | 4/1994 | Amadon et al. ............. 455/409 |
| 5,301,234 A | 4/1994 | Mazziotto et al. ........... 340/5.42 |
| 5,309,501 A | 5/1994 | Kozik et al. ................. 455/410 |
| 5,311,572 A | 5/1994 | Friedes et al. .......... 379/211.02 |
| 5,321,735 A | 6/1994 | Breeden et al. .............. 455/406 |
| 5,325,302 A | 6/1994 | Izidon et al. ................. 701/301 |
| 5,325,418 A | 6/1994 | McGregor et al. ........... 455/408 |
| 5,327,144 A | 7/1994 | Stilp et al. ................... 342/387 |
| 5,329,578 A | 7/1994 | Brennan et al. ......... 379/211.03 |
| 5,339,352 A | 8/1994 | Armstrong et al. ........... 455/417 |
| 5,341,410 A | 8/1994 | Aron et al. .................. 455/410 |
| 5,341,414 A | 8/1994 | Popke .................... 379/141.14 |
| 5,343,493 A | 8/1994 | Karimullah ................. 375/130 |
| 5,347,568 A | 9/1994 | Moody et al. .................. 379/45 |
| 5,351,235 A | 9/1994 | Lahtinen .................... 370/259 |
| 5,353,335 A | 10/1994 | D'Urso et al. ............ 379/114.2 |
| 5,359,182 A | 10/1994 | Schilling ..................... 235/380 |
| 5,359,642 A | 10/1994 | Castro .................... 379/121.01 |
| 5,359,643 A | 10/1994 | Gammino .................... 379/143 |
| 5,361,212 A | 11/1994 | Class et al. .................... 701/16 |
| 5,363,425 A | 11/1994 | Mufti et al. ............ 379/201.06 |
| 5,369,699 A | 11/1994 | Page et al. .................... 379/38 |
| 5,374,936 A | 12/1994 | Feng ........................... 342/457 |
| 5,381,338 A | 1/1995 | Wysocki et al. .............. 701/207 |
| 5,384,825 A | 1/1995 | Dillard et al. ................ 455/564 |
| 5,387,993 A | 2/1995 | Heller et al. ............ 340/825.49 |
| 5,388,147 A | 2/1995 | Grimes .................... 455/404.2 |
| 5,390,339 A | 2/1995 | Bruckert et al. ............. 455/410 |
| 5,394,158 A | 2/1995 | Chia ........................... 342/457 |
| 5,396,227 A | 3/1995 | Carroll et al. ............. 340/10.48 |
| 5,396,545 A | 3/1995 | Nair et al. ................. 379/91.01 |
| 5,396,558 A | 3/1995 | Ishiguro et al. ................ 705/67 |
| 5,398,190 A | 3/1995 | Wortham ................. 455/456.3 |
| 5,404,580 A | 4/1995 | Simpson et al. ............. 455/558 |
| 5,406,614 A | 4/1995 | Hara ........................ 455/435.3 |
| 5,408,513 A | 4/1995 | Busch, Jr. et al. ........... 455/558 |
| 5,408,519 A | 4/1995 | Pierce et al. ............. 379/88.17 |
| 5,412,726 A | 5/1995 | Nevoux et al. ............... 380/249 |
| 5,418,537 A | 5/1995 | Bird ........................ 342/357.09 |
| 5,423,076 A | 6/1995 | Westergren et al. ........... 455/86 |
| 5,430,759 A | 7/1995 | Yokev et al. |
| 5,432,841 A | 7/1995 | Rimer ........................ 455/457 |
| 5,434,789 A | 7/1995 | Fraker et al. ................. 473/407 |
| 5,438,615 A | 8/1995 | Moen ..................... 379/114.23 |
| 5,440,621 A | 8/1995 | Castro ..................... 379/114.2 |
| 5,454,024 A | 9/1995 | Lebowitz ..................... 379/40 |
| 5,457,737 A | 10/1995 | Wen ........................... 455/410 |
| 5,461,390 A | 10/1995 | Hoshen ....................... 342/419 |
| 5,465,289 A | 11/1995 | Kennedy, Jr. ................ 455/424 |
| 5,469,497 A | 11/1995 | Pierce et al. ........... 379/114.17 |
| 5,470,233 A | 11/1995 | Fruchterman et al. ....... 434/112 |
| 5,479,408 A | 12/1995 | Will ........................... 340/7.21 |
| 5,485,161 A | 1/1996 | Vaughn ................. 342/357.13 |
| 5,485,163 A | 1/1996 | Singer et al. ................. 342/457 |
| 5,485,505 A | 1/1996 | Norman et al. .............. 455/419 |
| 5,488,563 A | 1/1996 | Chazelle et al. .............. 701/301 |
| 5,494,091 A | 2/1996 | Freeman et al. .............. 152/517 |
| 5,497,149 A | 3/1996 | Fast ........................... 340/988 |
| 5,502,761 A | 3/1996 | Duncan et al. .......... 379/142.01 |
| 5,506,893 A | 4/1996 | Buscher et al. .......... 379/115.02 |
| 5,508,931 A | 4/1996 | Snider ........................ 701/207 |
| 5,509,056 A | 4/1996 | Ericsson et al. ......... 379/114.15 |
| 5,513,243 A | 4/1996 | Kage ....................... 455/456.4 |
| 5,515,287 A | 5/1996 | Hakoyama et al. .......... 701/301 |
| 5,517,555 A | 5/1996 | Amadon et al. .............. 455/408 |
| 5,517,559 A | 5/1996 | Hayashi et al. ......... 379/115.01 |
| 5,532,690 A | 7/1996 | Hertel ........................ 340/989 |
| 5,535,434 A | 7/1996 | Siddoway et al. ......... 455/575.1 |
| 5,539,398 A | 7/1996 | Hall et al. .................... 340/907 |
| 5,543,776 A | 8/1996 | L'Esperana et al. .... 340/426.25 |
| 5,550,897 A | 8/1996 | Seiderman ................. 455/558 |
| 5,552,772 A | 9/1996 | Janky et al. ................ 340/573.4 |
| 5,555,286 A | 9/1996 | Tendler ................... 455/404.2 |
| 5,568,119 A | 10/1996 | Schipper et al. ........... 340/10.41 |
| 5,570,416 A | 10/1996 | Kroll ...................... 379/114.01 |
| 5,574,648 A | 11/1996 | Pilley ......................... 701/120 |
| 5,577,100 A | 11/1996 | McGregor et al. ........... 455/406 |
| 5,579,372 A | 11/1996 | Astrom .................... 455/412.1 |
| 5,579,376 A | 11/1996 | Kennedy, III et al. ........ 455/411 |
| 5,583,918 A | 12/1996 | Nakagawa .................. 455/409 |
| 5,588,009 A | 12/1996 | Will ............................ 714/749 |
| 5,592,535 A | 1/1997 | Klotz ......................... 455/406 |
| 5,604,486 A | 2/1997 | Lauro et al. ................. 340/10.3 |
| 5,606,313 A | 2/1997 | Allen et al. ................. 340/10.31 |
| 5,606,850 A | 3/1997 | Nakamura ................ 56/10.2 A |
| 5,610,815 A | 3/1997 | Gudat et al. .................... 701/23 |
| 5,610,972 A | 3/1997 | Emery et al. ................ 455/445 |
| 5,614,890 A | 3/1997 | Fox ........................... 340/5.81 |
| 5,615,116 A | 3/1997 | Gudat et al. .................... 701/23 |
| 5,621,793 A | 4/1997 | Bednarek et al. ............ 380/240 |
| 5,625,669 A | 4/1997 | McGregor et al. ........... 455/418 |
| 5,628,051 A | 5/1997 | Salin .......................... 455/433 |
| 5,633,912 A | 5/1997 | Tsoi ........................... 455/566 |
| 5,682,600 A | 10/1997 | Salin ........................ 455/422.1 |
| 5,722,067 A | 2/1998 | Fougnies et al. .............. 455/406 |
| 5,732,346 A | 3/1998 | Lazaridis et al. ............. 455/406 |

| Patent No. | Kind | Date | Inventor | Class |
|---|---|---|---|---|
| 5,740,534 | A | 4/1998 | Ayerst et al. | 340/7.42 |
| 5,761,618 | A | 6/1998 | Lynch et al. | 455/419 |
| 5,767,795 | A | 6/1998 | Schaphorst | 340/988 |
| 5,768,509 | A | 6/1998 | Gunluk | 709/203 |
| 5,774,533 | A | 6/1998 | Patel | 379/127.03 |
| 5,778,313 | A | 7/1998 | Fougnies | 455/406 |
| 5,787,357 | A | 7/1998 | Salin | 455/466 |
| 5,790,636 | A | 8/1998 | Marshall | 379/88.19 |
| 5,793,859 | A | 8/1998 | Matthews | 379/211.03 |
| 5,794,142 | A | 8/1998 | Vanttila et al. | 455/419 |
| 5,797,094 | A | 8/1998 | Houde et al. | 455/412.2 |
| 5,802,492 | A | 9/1998 | DeLorme et al. | 455/456.5 |
| 5,806,000 | A | 9/1998 | Vo et al. | 455/466 |
| 5,815,816 | A | 9/1998 | Isumi | 455/458 |
| 5,822,700 | A | 10/1998 | Hult et al. | 455/466 |
| 5,825,283 | A * | 10/1998 | Camhi | 340/438 |
| 5,826,185 | A | 10/1998 | Wise et al. | 455/405 |
| 5,828,740 | A | 10/1998 | Khuc et al. | 379/114.2 |
| 5,850,599 | A | 12/1998 | Seiderman | 455/406 |
| 5,854,975 | A | 12/1998 | Fougnies et al. | 455/408 |
| 5,905,736 | A | 5/1999 | Ronen et al. | 370/546 |
| 5,920,821 | A | 7/1999 | Seazholtz et al. | 455/466 |
| 5,930,701 | A | 7/1999 | Skog | 455/415 |
| 5,940,755 | A | 8/1999 | Scott | 455/426.1 |
| 5,943,399 | A | 8/1999 | Bannister et al. | 379/88.17 |
| 5,946,629 | A | 8/1999 | Sawyer et al. | 455/466 |
| 5,950,130 | A | 9/1999 | Coursey | 455/432.1 |
| 5,953,398 | A | 9/1999 | Hill | 379/121.04 |
| 5,974,054 | A | 10/1999 | Couts et al. | 370/470 |
| 5,974,133 | A | 10/1999 | Fleischer, III et al. | 379/230 |
| 5,978,685 | A | 11/1999 | Laiho | 455/466 |
| 5,983,091 | A | 11/1999 | Rodriguez | 455/405 |
| 5,987,323 | A | 11/1999 | Huotari | 455/433 |
| 5,998,111 | A | 12/1999 | Abe | 430/458 |
| 5,999,811 | A | 12/1999 | Moine | 455/432.3 |
| 6,029,062 | A | 2/2000 | Hanson | 455/408 |
| 6,035,025 | A | 3/2000 | Hanson | 379/114.2 |
| 6,049,710 | A | 4/2000 | Nilsson | 455/409 |
| 6,058,300 | A | 5/2000 | Hanson | 455/406 |
| 6,064,875 | A | 5/2000 | Morgan | 455/410 |
| 6,073,004 | A | 6/2000 | Balachandran | 455/404.2 |
| 6,073,015 | A | 6/2000 | Berggren | |
| 6,075,982 | A | 6/2000 | Donovan et al. | 455/406 |
| 6,081,508 | A | 6/2000 | West et al. | 370/238 |
| 6,101,378 | A | 8/2000 | Barabash et al. | 455/406 |
| 6,115,458 | A | 9/2000 | Taskett | 379/114.2 |
| 6,122,503 | A | 9/2000 | Daly | 455/419 |
| 6,122,510 | A | 9/2000 | Granberg | 455/433 |
| 6,122,520 | A | 9/2000 | Want et al. | 455/456.2 |
| 6,131,028 | A | 10/2000 | Whitington | 455/456.2 |
| 6,148,197 | A | 11/2000 | Bridges et al. | 455/432.3 |
| 6,148,198 | A | 11/2000 | Anderson et al. | 455/432.1 |
| 6,149,353 | A | 11/2000 | Nilsson | 455/409 |
| 6,157,823 | A | 12/2000 | Fougnies et al. | 455/406 |
| 6,157,831 | A | 12/2000 | Lamb | 455/433 |
| 6,173,181 | B1 | 1/2001 | Losh | 455/434 |
| 6,181,935 | B1 | 1/2001 | Gossman et al. | 455/433 |
| 6,188,752 | B1 | 2/2001 | Lesley | 379/114.16 |
| 6,192,241 | B1 | 2/2001 | Yu et al. | 455/433 |
| 6,195,543 | B1 | 2/2001 | Granberg | 455/407 |
| 6,198,431 | B1 | 3/2001 | Gibson | 342/357.07 |
| 6,199,045 | B1 | 3/2001 | Giniger et al. | 705/1 |
| 6,205,330 | B1 | 3/2001 | Winbladh | 455/426.1 |
| 6,208,854 | B1 | 3/2001 | Roberts et al. | 455/417 |
| 6,223,046 | B1 | 4/2001 | Hamill-Keays et al. | 455/512 |
| 6,226,529 | B1 | 5/2001 | Bruno et al. | 455/557 |
| 6,249,680 | B1 | 6/2001 | Wax et al. | 455/456.2 |
| 6,249,744 | B1 | 6/2001 | Morita | 701/213 |
| 6,266,614 | B1 | 7/2001 | Alumbaugh | 701/211 |
| 6,317,594 | B1 | 11/2001 | Gossman et al. | 455/414.1 |
| 6,327,479 | B1 | 12/2001 | Mikkola | 455/466 |
| 6,335,968 | B1 | 1/2002 | Malik | 379/114.2 |
| 6,356,630 | B1 | 3/2002 | Cai et al. | 379/144.01 |
| 6,373,930 | B1 | 4/2002 | McConnell et al. | 379/114.28 |
| 6,381,316 | B2 | 4/2002 | Joyce et al. | 379/114.2 |
| 6,393,269 | B1 | 5/2002 | Hartmaier et al. | 455/406 |
| 6,396,913 | B1 | 5/2002 | Perkins, III | 379/112.01 |
| 6,397,055 | B1 | 5/2002 | McHenry et al. | 455/408 |
| 6,442,257 | B1 | 8/2002 | Gundlach | 379/114.01 |
| 6,456,852 | B2 | 9/2002 | Bar et al. | 455/456.1 |
| 6,483,907 | B1 | 11/2002 | Wong et al. | 379/112.01 |
| 6,490,450 | B1 | 12/2002 | Batni et al. | 455/433 |
| 6,526,335 | B1 * | 2/2003 | Treyz et al. | 701/1 |
| 6,529,593 | B2 | 3/2003 | Nelson | 379/114.2 |
| 6,560,456 | B1 | 5/2003 | Lohtia et al. | 455/445 |
| 6,587,688 | B1 | 7/2003 | Chambers et al. | 455/433 |
| 6,728,353 | B1 | 4/2004 | Espejo et al. | 379/114.2 |
| 6,731,943 | B1 | 5/2004 | McCormick | |
| 6,868,074 | B1 * | 3/2005 | Hanson | 370/328 |
| 7,130,383 | B2 * | 10/2006 | Naidoo et al. | 379/37 |
| 7,180,415 | B2 * | 2/2007 | Bankert et al. | 340/539.17 |
| 7,245,216 | B2 * | 7/2007 | Burkley et al. | 340/539.13 |
| 7,317,705 | B2 * | 1/2008 | Hanson | 370/329 |
| 7,386,588 | B2 | 6/2008 | Mousseau | |
| 2001/0040949 | A1 | 11/2001 | Blonder et al. | 379/144.01 |
| 2001/0049274 | A1 | 12/2001 | Degraeve | |
| 2002/0103762 | A1 | 8/2002 | Lopez et al. | 705/63 |
| 2002/0116263 | A1 | 8/2002 | Gouge | 705/14 |
| 2002/0118800 | A1 | 8/2002 | Martinez et al. | 379/67.1 |
| 2002/0119793 | A1 | 8/2002 | Hronek et al. | 455/466 |
| 2002/0156732 | A1 | 10/2002 | Odijk | |
| 2002/0168986 | A1 | 11/2002 | Lau et al. | 455/456.1 |
| 2003/0058096 | A1 | 3/2003 | Shteyn | |
| 2003/0060212 | A1 | 3/2003 | Thomas | 455/456.1 |
| 2003/0100320 | A1 | 5/2003 | Ranjan | 455/466 |
| 2003/0147537 | A1 | 8/2003 | Jing et al. | 380/227 |
| 2004/0092250 | A1 | 5/2004 | Valloppillil | 455/412.1 |
| 2004/0103431 | A1 | 5/2004 | Davenport et al. | |
| 2004/0199614 | A1 | 10/2004 | Shenfield et al. | |
| 2004/0203900 | A1 | 10/2004 | Cedervall et al. | |
| 2004/0203922 | A1 | 10/2004 | Hines et al. | 455/456.1 |
| 2004/0235493 | A1 | 11/2004 | Ekerborn | 455/456.1 |
| 2005/0020287 | A1 | 1/2005 | Pohutsky et al. | |
| 2005/0048948 | A1 | 3/2005 | Holland et al. | 455/404.1 |
| 2005/0135569 | A1 | 6/2005 | Dickinson et al. | |
| 2005/0277432 | A1 | 12/2005 | Viana et al. | |
| 2005/0282518 | A1 | 12/2005 | D'Evelyn | |
| 2006/0109960 | A1 | 5/2006 | D'Evelyn | |
| 2006/0116138 | A1 | 6/2006 | Simsek et al. | |
| 2006/0183460 | A1 * | 8/2006 | Srinivasan et al. | 455/410 |
| 2007/0149208 | A1 | 6/2007 | Syrbe | |

FOREIGN PATENT DOCUMENTS

| | | |
|---|---|---|
| GB | 9526041.0 | 6/1997 |
| WO | PCTSE9800992 | 12/1998 |
| WO | WO9856160 | 12/1998 |
| WO | PCTSE9900875 | 11/1999 |
| WO | WO9960801 | 11/1999 |
| WO | PCTFI9900935 | 5/2000 |
| WO | WO0028746 | 5/2000 |

OTHER PUBLICATIONS

ETSI/3Gpp, 3$^{rd}$ Generation Partnership Project; Technical Specification Group Services and System Aspects; General Packet Radio Service (GPRS); Service description; Stage 2; (3G TS 23.060 version 3.2.1), Jan. 2000, pp. 138-142.

ETSI,3GPP, 3$^{rd}$ Generation Partnership Project; Technical Specification Group Core Network; Customized Applications for Mobile network Enhanced Logic; (Camel) Phase 3—Stage 2 (3G TS 23.078 version 3.3.0), 12/199, pp. 300-329.

Bond, "Cellular Carriers Use Prepaid Programs to Reach Untapped Markets," Billing World, Mar. 1997, pp. 14-17.

MultiMedia Publishing Corp., "Prepaid Cellular and Prepaid Wireless Market Report and Forecast 1997-2002," sales literature, undated.

Open Development Corp., "openMedia Cellular Prepaid," sales literature, undated, 1992.

Tecore, Inc., "Pre-Paid Cellular," sales literature, Mar. 25, 1997, pp. 1-4.

PCT International Search Report (PCTUS2007/16138) and Written Opinion of International Searching Authority, Feb. 7, 2008.

PCT International Search Report received in PCT/US2007/21133 dated Apr. 21, 2008.

\* cited by examiner

FIRST RESPONDER WIRELESS EMERGENCY ALERTING WITH AUTOMATIC CALLBACK AND LOCATION TRIGGERING

This application claims priority from U.S. Provisional Application No. 60/706,050, entitled "First Responder Wireless Emergency Alerting With Automatic Callback and Location Triggering", to Titus and Pohutsky, filed Aug. 8, 2005, the entirety of which is expressly incorporated herein by reference.

BACKGROUND OF THE INVENTION

1. Field of the Invention

This invention relates generally to communications in an emergency. More particularly, it relates to the use of wireless telecommunication such as short message systems (SMS), prepaid wireless systems, wireless location systems, wireless voice, multimedia systems (MMS) and/or wireless mapping systems for alerting first responders and/or others.

2. Background of the Related Art

Emergency alert systems exist that alert the public of a public emergency. However, existing technologies have not been successfully integrated to provide a complete as possible solution for emergency alert notification and management of first responders.

In the United States, the Emergency Alert System (EAS) is the primary means for providing the public with critical alert information about an emergency or disaster. This Federal Communications Commission (FCC)—mandated system totally replaced the old Emergency Broadcast System as of Jan. 1, 1998. Under EAS rules, radio, TV, and cable TV stations must participate at the National level or specifically request a waiver from the FCC. Further, they are encouraged to voluntarily participate in state and local EAS plans. The National Weather Service (NWS) is also included in the process for using EAS to disseminate critical emergency weather information to the public and government officials.

The EAS takes advantage of digital technology that will ultimately allow home devices such as AM and FM radios, TVs, or unique receivers to be turned on and an alarm sounded so the listener can hear the message. It will also allow devices serving the hearing and sight impaired to receive the message. The heart of the system is a special encode/decode device sometimes referred to as a "smart box" that all broadcasters had to have in-place as of January 1997. These "smart boxes" through special protocol, talk to each other via multiple radio frequency (RF) paths, which form a web type architecture. As outlined in the State EAS Plan, all "signal originators" will initiate an alert message from one of the "smart box" devices. Through "electronic encoding" of the message, which this device accomplishes, the message is generated and sent. Through "electronic decoding" of the message, the message is received and/or rebroadcast for the areas the alert message is targeted.

The original Emergency Broadcast System (EBS), developed in 1963 under the Kennedy administration, was replaced in 1994 by the Emergency Alert System (EAS), developed by the FCC. The EAS expanded the EBS to more outlets and allowed more detailed information to be distributed, but even the EAS relies extensively on television and radio to distribute warnings. FEMA, which manages the EAS, is now teaming with other federal agencies as well as state technology leadership and the private sector to create an All Alert system. The All Alert system will build on the Amber Alert infrastructure to more efficiently alert the public via a wide variety of communication devices, when emergencies occur.

All Alert is anticipated to utilize the digital capabilities of the nation's public television stations and the voluntary participation of cellular phone service providers, public and commercial radio, television broadcasters, satellite radio, cable and Internet providers, and equipment manufacturers.

One goal of the All Alert system is to adapt the Amber Alert platform to a common messaging infrastructure that will be owned at the federal and state levels such that when an alert goes out to the public, it will be very easy for anyone to pick up the message via a variety of communication tools. All Alert is expected to greatly expand the EAS, which today is restricted in how much information it can provide and its ability to supply follow-up instructions, such as where people should seek shelter.

While Amber Alert is one specific alert coming from one specific first responder group—law enforcement—All Alert is anticipated to include multiple types of alerts from multiple first responder groups that are then passed to the public. The All Alert system is expected to make first responders' jobs easier because they can get information out to the community fast. However, neither the All Alert system nor any other existing technology has been able to provide a complete solution for emergency alert notification and management not directed to the public, but rather to first responders.

The prior emergency alert systems such as EAS, EBS and All Alert are all broadcast technologies wherein any or all persons in the public hear the same generalized information.

There is a need for an emergency alert notification system that is focused on a particular receiver. There is also a need for methods to alert first responders to emergencies, as well a system and method to provide the first responders with information relating to the emergency for which they are being alerted.

SUMMARY OF THE INVENTION

In accordance with the principles of the present invention, apparatus is provided to provide alert information to a first responder in an emergency situation, comprising an alerts engine to trigger an alert message to at least one first responder. A remote agent communicates the alert message to the first responder via a data message gateway. A first responder database stores information for use by the alerts engine relating to provisions of the first responder.

In accordance with another aspect of the invention, a method for providing alert information to a first responder in an emergency situation comprises directing an emergency message to a first responder. The emergency message is relevant to a specific current location of the first responder. An automatic call back to a sender of the emergency message is initiated. A voice call is triggered from the first responder. A location fix on a current location of the first responder is launched.

DETAILED DESCRIPTION OF ILLUSTRATIVE EMBODIMENTS

The present invention enables a public service agency to notify and manage a team of first responders in the event of an emergency. The present invention is independent of mobile operator networks regardless of wireless network standard GSM, CDMA, TDMA, etc.

Disparate technologies in the field of Internet, wireless voice and data communication, and emergency alerting are integrated to uniquely leverage a wireless intelligent network and application triggers that enable a public service agency to provide alert information to first responders.

Figure 1:
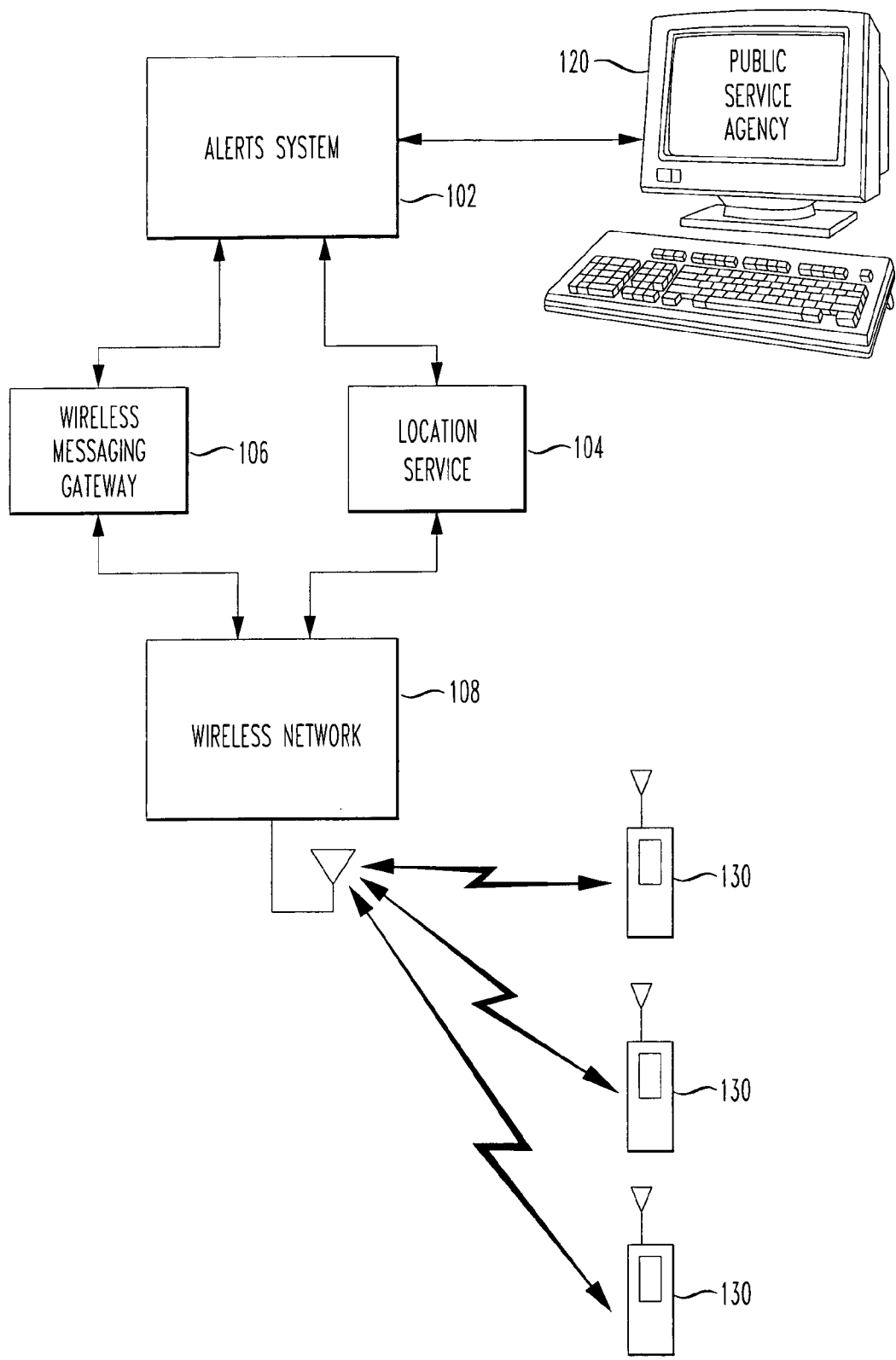
FIG. 1 is a general depiction of a first responder wireless emergency alerting system according to the present invention.

FIG. 1 is a general depiction of a first responder wireless emergency alerting system according to the present invention.

In particular, as shown in FIG. 1, the first responder wireless emergency alerting system includes an alerts system 102, in communication with a wireless messaging gateway 106, in turn in communication with a wireless network 108 servicing a plurality of wireless devices (e.g., mobile phones 130). The wireless network 108 has access to a location service 104, which provides information concerning the location of wireless devices 130 to the alerts system 102 for use by, e.g., a public service access point (PSAP) 120.

Figure 2:
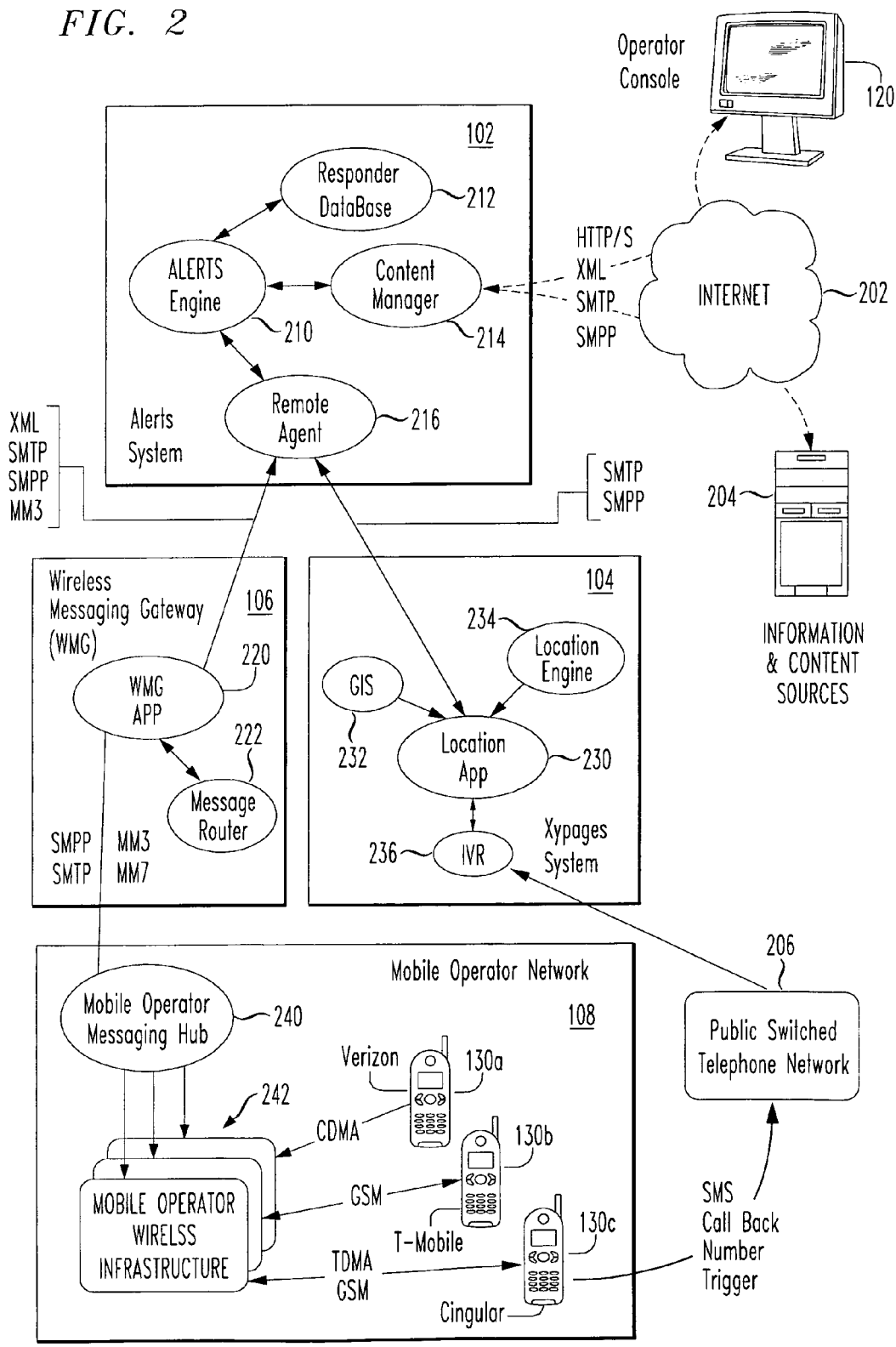
FIG. 2 shows an exemplary detailed network diagram of the first responder wireless emergency alerting system of FIG. 1.

FIG. 2 shows an exemplary detailed network diagram of the first responder wireless emergency alerting system of FIG. 1.

In particular, as shown in FIG. 2, an exemplary alerts system 102 includes an alerts engine 210, a responder database 212, a content manager 214, and a remote agent 216.

The location service 104 includes a location application 230, e.g., an XYPages™ application commercially available from TeleCommunication Systems, Inc. of Annapolis, Md. The location service 104 further includes an interactive voice response (IVR) module 236, a location engine 234, and a Geographic Information System (GIS) 232.

The wireless messaging gateway 106 can be depicted as including a wireless messaging gateway application 220 as well as a message router 222.

The wireless network 108 can vary greatly. In the exemplary embodiments, the wireless network 108 is depicted as including a mobile operator messaging hub 240, and one or more mobile operator wireless infrastructures 242, each corresponding to its own mobile devices 130a, 130b, 130c. To show the breadth of applicability of the present invention, a wireless infrastructure is shown supporting CDMA type mobile devices 130a, GSM type mobile devices 130b, and TDMA/GSM type mobile devices 130c, herein referred to collectively in any combination, including as only a single type device, by reference 130.

The mobile devices 130 of the mobile operator network 108 may communicate back with the location service 104 via the public switched telephone network (PSTN) 206. Moreover, the PSAP or other emergency agency preferably communicates with the alerts system 102 via the Internet 202. Other information and/or content sources 204 are accessible through the Internet 202.

In accordance with the principles of the present invention, the public service (e.g., emergency) agency 120 preferably receives positive acknowledgement that each responder, utilizing respective mobile devices 130, has received their emergency alert information. In the disclosed embodiments, a positive acknowledgement is sent using an embedded call-back number in the alert that initiates an automatic call back (e.g., voice call). Preferably, the automatic call back (e.g., voice call) is directed to the interactive voice response (IVR) system 136, located, e.g., with the location service 104.

A serving mobile switching center processes execution of an IVR call back event, and triggers a location request. The location request launches a location fix on the current location of the relevant first responder being alerted.

Once the location fix has been completed for a given first responder being alerted, then location-based information may be sent to that first responder 130. In a preferred embodiment, the location-based information is determined and sent to the relevant first responder 130 as a current location fix for that first responder 130. Though not preferred, the location-based information may alternatively be transmitted to the first responders 130 after the location of all first responders 130 being alerted is obtained.

Exemplary location-based information sent to the first responders 130 may include, but is certainly not limited to, driving directions and/or a map image relevant to the emergency. For instance, a map between the current location of that particular first responder and the location of the incident to which they are responding may be provided, together with driving directions particular to that first responder to guide them the fastest and/or best route to the emergency destination.

The fastest and/or best route provided to the first responder 130 may include and/or be determined based upon current traffic conditions. For instance, traffic may be congested in a region along a most direct route for the first responder 130 to take to the destination. In such a case, driving directions may instruct and/or direct the first responder 130 around such congestion.

The fastest and/or best route may also, or alternatively, direct the first responder 130 along a route controlled by street lights for fast, safe passage of the first responder's vehicle. In any event, generally speaking, driving directions and/or map image or other relevant location-based information may be sent to the first responder based on their current location and instigating destination in need of emergency response.

Figure 3:
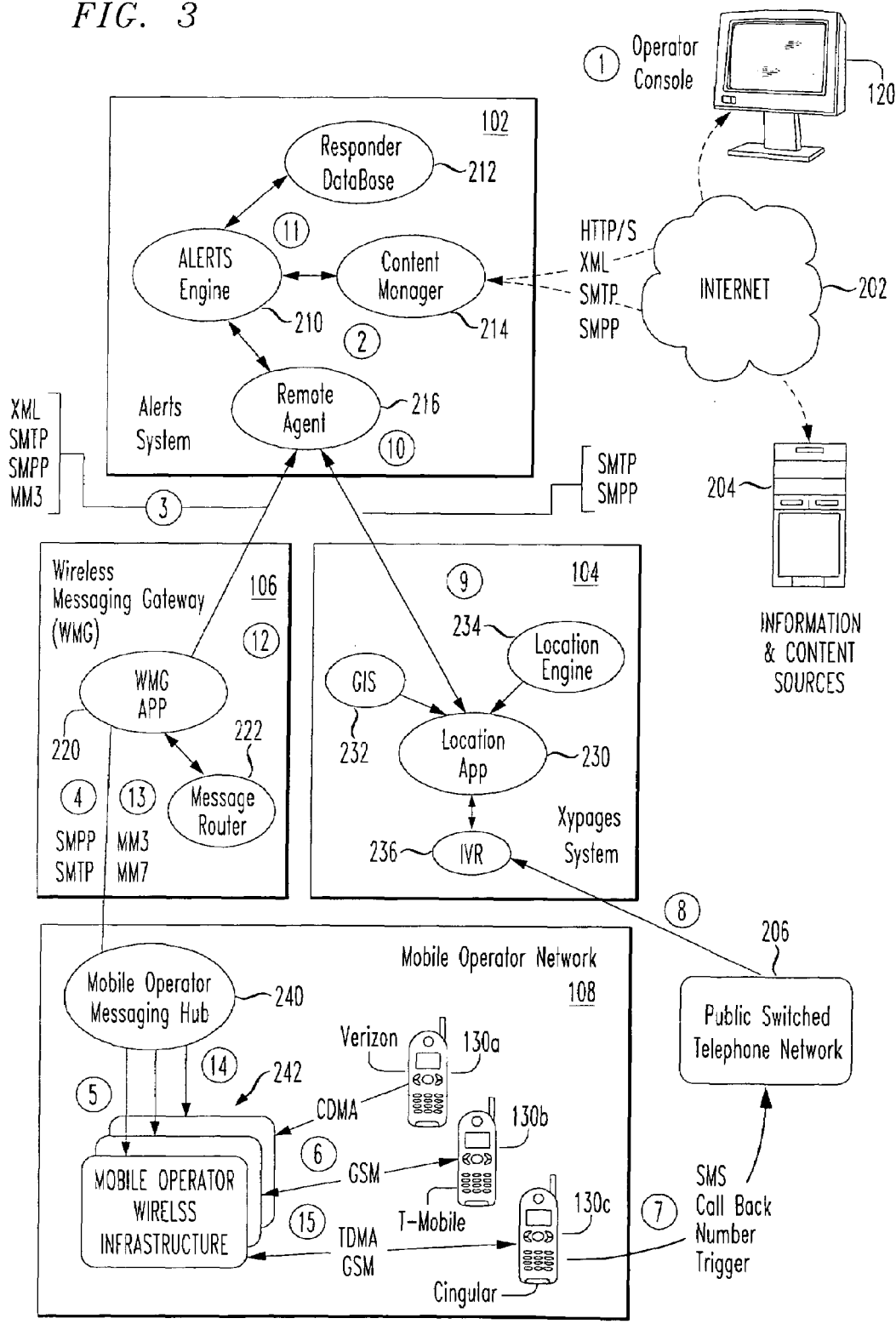
FIG. 3 shows an exemplary message flow passed among the various elements of FIG. 2, in accordance with one embodiment of the present invention.

FIG. 3 shows an exemplary message flow passed among the various elements of FIG. 2, in accordance with one embodiment of the present invention.

In particular, a message flow is depicted by circled numeric references 1 through 15, as shown in FIG. 3 and as described herein below.

For example, in step 1 of FIG. 3, the system operator launches a web browser to access the alerts system 102 via a secure HTTP session over the Internet 202. The system operator first provisions a list of mobile first responder users 130 and their respective member groups in the responder database 212. Provisioning information is used to describe the profile of each individual responder 130. Profile information preferably includes, but is not limited to, the following:

mobile directory number e.g., cell phone number;
mobile device type; and
Information content type used to trigger an emergency alert e.g., Homeland Security, National Weather Service, etc.
Information content can be "published" to mobile responders 130 in one of two methods:
manually through operator data entry; or
automatically through information content received asynchronously from external sources over a secure Internet connection (note that this example call flow uses HTTP/S). The information very preferably can be transferred via several different communication protocols, e.g., HTTP/S, FTP, SMPP, SMTP, etc.

In step 2, an external content source 204 sends an information alert (e.g., change in terror alert level) to the content manager 214 component of the alerts system 102. The content manager 214 logs the event into the responder database 212, processes the received information extracting the payload data, i.e., the actual message to be sent to the mobile responder 130, then passes the message onto the alerts engine 210 for further processing and delivery to the mobile device 130.

The alerts engine 210 application logic associates the content type (e.g., terrorist alert) with a unique 10 digit phone number that subsequently rings on an inbound port on the location service's Interactive Voice Response (IVR) subsystem 236 (e.g., an XY pages Interactive Voice Response (IVR) system commercially available from TeleCommunications Systems, Inc.)

The 10-digit IVR phone number corresponding to content type is then encoded as a callback number primitive in the destination message that is ultimately sent to the mobile responder 130. Once the alerts message composition is completed, the alerts engine 210 places the message into the send queue of the remote agent component 216.

In step 3, the remote agent 216 forwards the message to the Wireless Messaging Gateway (WMG) 220 for final formatting and routing to the mobile operator network 108. The remote agent 216 can forward this message using any suitable industry standard protocol, e.g., SMTP, SMPP, XML, MM3 or RMI. Regardless of the communications protocol used, the emergency alerts notification message is of type plain text and can be further encoded to receive delivery receipt confirmation.

In step 4, the WMG 220 forwards the message to the mobile operator messaging hub 240 or equivalent network element via any suitable industry standard protocol, e.g., SMTP, SMPP, MM3, MM7, XML, or RMI. The actual communications protocol used is dependent upon the type of message (e.g., plain text or multimedia) and carrier specific interface provisioning parameters.

In step 5, the mobile operator messaging hub 240 delivers the inbound alerts message to the messaging network element as defined by the messaging routing rules or algorithms set up by each operator. Typically plain text messages with character length of <160 characters will be sent to a short message service center (SMSC) store and forward.

Alternatively, or additionally, as a result of executing the callback, the emergency agency may preferably receive a positive acknowledgement that a first responder 130 has responded. In this way, the alerts operator may be provided with positive confirmation that the recipient(s) successfully received the information alert, as well as their current location.

In step 6, the SMSC follows the appropriate industry standard specification (e.g., GSM, TDMA, or CDMA) for delivery of the emergency alerts message to the destination mobile device 130. After the message is delivered to the mobile device 130, the end user may open the message to read the information content. Since a callback number has been encoded in this alert message, the mobile device 130 can automatically initiate a phone call as a reply to this message. In a preferred embodiment, a 'one button reply' may be implemented for the user (e.g., first responder) of the mobile device 130 to activate at their mobile device 130 to initiate the reply phone call.

In step 7, the mobile user invokes a call back number function from their mobile device 130 to originate a phone call that terminates on a suitable application port, e.g., an "XYpages IVR"™ system 236 inbound port corresponding to the alert type (e.g., terrorist level). A call trigger is set up in the Mobile Switching Centers (MSCs) in the operator network 108 to forward the Origination Request message (e.g., ORREQ in IS-41) to an SS7 point code (i.e., address) corresponding to, e.g., an XYpages™ voice service.

A location query is then initiated. For instance, the network origination request message may be used by the location application 230 to launch a location query to the network's generic position determination entity (PDE) to determine the actual location (i.e., X, Y coordinate) of the mobile first responder subscriber 130. This location query message conforms to industry standard techniques used in either GSM or CDMA wireless networks.

In step 8, once the location query returns the location of the first responder, the location application 230 instructs the MSC 108 to forward to call onto the called party (e.g., terrorist level IVR port). At this point in the disclosed embodiment, the first responder user hears a pre-recorded announcement corresponding to the appropriate message, e.g., "The terrorist alert level has been raised; please await further information and instructions that will be sent to your device momentarily."

In step 9, the location application 230 then uses the location of the first responder as the starting address input parameter to create, e.g., driving directions, map, etc. as calculated by the location engine component 234. The location engine component 234 looks up destination reporting addresses as provisioned by the alerts operator based on the type of scenario.

For example, in the case of a terrorist alert level, the destination address might correspond to an airport, government building, port authority, etc. Preferably, public service agency personnel or other operators will have provisioned this information in advance. The location engine 234 may generate step by step driving instructions and/or a map image containing, e.g., destination points of interest, and preferably the current location of the first responder as a starting point.

The location application 230 encodes the calling party identification (i.e., mobile directory number of the mobile responder), date and time stamp of call received, mobile responder current location, driving directions and map image into a data structure that is forwarded to the alerts remote agent 216.

In step 10, the alerts remote agent 216 decodes the information received by the location application 230 and passes the message on to the alerts engine 210 for processing.

In step 11, the alerts engine 210 processes the information and logs the call record into the responder database 212 as tracking data. This also provides the alerts operator with positive confirmation that the recipient(s) successfully received the information alert, as well as their current location.

In step 12, in this scenario, the alerts engine 210 composes the driving directions and/or map image into a suitable multimedia message, e.g., in the MM3 protocol as defined by the 3GPP standards body for Multimedia Messaging System (MMS). The alerts engine 210 then places this message into the send queue of the remote agent 216, which then forwards it onto the WMG 106.

It is important to note that the service is not limited to sending of map images only. The alerts engine 210 preferably supports any Multipurpose Internet Mail Extension (MIME) type attachment that is capable of being transmitted by the alerts engine 210, e.g., a terrorist photo, an audio sound byte, a video recording, etc.

In step 13, the WMG 106 examines the mobile directory number specified in the inbound message and uses the message router 222 to translate the destination address to the appropriate carrier domain name. In this case the message type is a multimedia message containing driving directions and map image.

In step 14, the mobile operator messaging hub 240 delivers the MMS message to the messaging network element 108 as defined by the messaging routing rules or algorithms setup by each operator. In this case the message will be routed to the appropriate MMSC network element. Should the mobile device 130 not support MMS, then images (e.g., the map image) may be stripped and only plain text sent (e.g., driving instructions).

In step 15, the MMSC follows the appropriate industry standard specification (e.g., GSM, TDMA, and CDMA) for delivery of the multimedia message to the destination mobile device 130. After the message is delivered to the first responder's mobile device 130, the end user is able to open the message to read its information content, thereby ending the service call flow.

The present invention has particular applicability for use by local, state and federal government agencies.

While the invention has been described with reference to the exemplary embodiments thereof, those skilled in the art will be able to make various modifications to the described embodiments of the invention without departing from the true spirit and scope of the invention.

What is claimed is:

1. Apparatus to provide alert information to an emergency responder in an emergency situation, comprising:
    an alerts engine to trigger an association of an emergency content type with a telephone number, and communication of an alert message to at least one said emergency responder based on a remotely monitored current location of said at least one said emergency responder;
    a remote agent to communicate said alert message and said telephone number based on said remotely monitored current location of said at least one said emergency responder to said at least one emergency responder via a data message gateway, said data message gateway adapted to determine said remotely monitored current location of said at least one emergency responder from a wireless location service; and
    an emergency responder database to store information for use by said alerts engine relating to provisions of said at least one emergency responder.

2. The apparatus to provide alert information to an emergency responder in an emergency situation according to claim 1, wherein:
    said remote agent is adapted to receive location information relating to a current position of said at least one emergency responder.

3. The apparatus to provide alert information to an emergency responder in an emergency situation according to claim 1, wherein:
    said remote agent is adapted to receive an acknowledgement that said at least one emergency responder has received said alert message.

4. The apparatus to provide alert information to an emergency responder in an emergency situation according to claim 3, wherein:
    said acknowledgement is initiated with a voice callback call from said at least one emergency responder to said remote agent.

5. The apparatus to provide alert information to an emergency responder in an emergency situation according to claim 4, wherein:
    said voice callback call is routed at least in part using a Public Switched Telephone Network (PSTN).

6. The apparatus to provide alert information to an emergency responder in an emergency situation according to claim 3, wherein:
    said acknowledgement is routed to a location service.

7. The apparatus to provide alert information to an emergency responder in an emergency situation according to claim 1, further comprising:
    a content manager to provide a content of said alert message.

8. The apparatus to provide alert information to an emergency responder in an emergency situation according to claim 1, wherein:
    said alert message is a multimedia message.

9. The apparatus to provide alert information to an emergency responder in an emergency situation according to claim 1, wherein:
    said alert message includes map information based on said remotely monitored current location of said at least one emergency responder.

10. The apparatus to provide alert information to an emergency responder in an emergency situation according to claim 1, wherein:
    said data message includes driving instructions relevant to said at least one emergency responder.

11. A method for providing alert information to an emergency responder in an emergency situation, comprising:
    associating an emergency content type with a telephone number;
    communicating an emergency message and said telephone number to at least one said emergency responder, said emergency message being relevant to a specific remotely monitored current location of said at least one emergency responder;
    initiating an automatic call back to a sender of said emergency message;
    triggering a voice call from said at least one emergency responder; and
    launching a location fix to determine said specific remotely monitored current location of said at least one emergency responder from a wireless location service.

12. The method for providing alert information to an emergency responder in an emergency situation according to claim 11, further comprising:
    once said location fix has been completed, then sending location-based information based on a current position of said at least one emergency responder.

13. The method for providing alert information to an emergency responder in an emergency situation according to claim 12, wherein said location-based information comprises:
    driving directions from a current position of said at least one emergency responder to an intended destination of said at least one emergency responder.

14. The method for providing alert information to an emergency responder in an emergency situation according to claim 12, wherein said location-based information comprises:
    a map image based on said specific remotely monitored current location of said at least one emergency responder.

15. The method for providing alert information to an emergency responder in an emergency situation according to claim 12, wherein:
    said location-based information is based on both a current position of said at least one emergency responder as well as an intended destination of said at least one emergency responder.

16. The method for providing alert information to an emergency responder in an emergency situation according to claim 11, wherein:
said voice call triggers said launched location fix.

17. The method for providing alert information to an emergency responder in an emergency situation according to claim 11, further comprising:
receiving delivery confirmation that said at least one emergency responder has received said alert information.

18. The method for providing alert information to an emergency responder in an emergency situation according to claim 11, further comprising:
initiating said alert from a public service agency.

19. The method for providing alert information to an emergency responder in an emergency situation according to claim 11, wherein:
said public service agency is a public service access point (PSAP).

20. Apparatus for providing alert information to an emergency responder in an emergency situation, comprising:
associating an emergency content type with a telephone number;
means for communicating an emergency message and said telephone number to at least one emergency responder, said emergency message being relevant to a specific remotely monitored current location of said at least one emergency responder;
means for initiating an automatic call back to a sender of said emergency message;
means for triggering a voice call from said at least one emergency responder; and
means for launching a location fix to determine said specific remotely monitored current location of said at least one emergency responder from a wireless location service.

21. The apparatus for providing alert information to an emergency responder in an emergency situation according to claim 20, further comprising:
means for sending location-based information based on a current position of said at least one emergency responder, once said location fix has been completed.

22. The apparatus for providing alert information to an emergency responder in an emergency situation according to claim 21, wherein said location-based information comprises:
driving directions from a current position of said at least one emergency responder to an intended destination of said at least one emergency responder.

23. The apparatus for providing alert information to an emergency responder in an emergency situation according to claim 21, wherein said location-based information comprises:
a map image based on said specific remotely monitored current location of said at least one emergency responder.

24. The apparatus for providing alert information to an emergency responder in an emergency situation according to claim 21, wherein:
said location-based information is based on both a current position of said at least one emergency responder as well as an intended destination of said at least one emergency responder.

25. The apparatus for providing alert information to an emergency responder in an emergency situation according to claim 20, wherein:
said voice call triggers said launched location fix.

26. The apparatus for providing alert information to an emergency responder in an emergency situation according to claim 20, further comprising:
means for receiving delivery confirmation that said at least one emergency responder has received said alert information.

27. The apparatus for providing alert information to an emergency responder in an emergency situation according to claim 20, further comprising:
means for initiating said alert from a public service agency.

28. The apparatus for providing alert information to an emergency responder in an emergency situation according to claim 20, wherein:
said public service agency is a public service access point (PSAP).

* * * * *